(12) United States Patent
Wang et al.

(10) Patent No.: US 12,501,134 B2
(45) Date of Patent: Dec. 16, 2025

(54) OPTICAL ENGINE WITH MULTIPLE LIGHT SOURCES AND PACKAGE STRUCTURE THEREOF

(71) Applicant: PixArt Imaging Inc., Hsin-Chu County (TW)

(72) Inventors: Yen-Hung Wang, Hsin-Chu County (TW); Wen-Yen Su, Hsin-Chu County (TW); Hui-Hsuan Chen, Hsin-Chu County (TW); Hung-Yu Lai, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 18/650,148

(22) Filed: Apr. 30, 2024

(65) Prior Publication Data
US 2024/0284025 A1  Aug. 22, 2024

Related U.S. Application Data

(63) Continuation of application No. 17/841,582, filed on Jun. 15, 2022, now Pat. No. 12,010,413, which is a continuation-in-part of application No. 17/375,035, filed on Jul. 14, 2021, now Pat. No. 11,595,554, which is a continuation of application No. 16/547,568, filed on Aug. 22, 2019, now Pat. No. 11,095,799.

(60) Provisional application No. 63/235,823, filed on Aug. 23, 2021, provisional application No. 62/756,110, filed on Nov. 6, 2018.

(51) Int. Cl.
*H04N 23/54*  (2023.01)
*G05D 1/00*  (2006.01)
*G05D 1/249*  (2024.01)
*H04N 23/55*  (2023.01)
*H04N 23/56*  (2023.01)

(52) U.S. Cl.
CPC .......... *H04N 23/54* (2023.01); *G05D 1/0246* (2013.01); *G05D 1/249* (2024.01); *H04N 23/55* (2023.01); *H04N 23/56* (2023.01)

(58) Field of Classification Search
CPC ......... H04N 23/54; H04N 23/55; H04N 23/56
See application file for complete search history.

(56) References Cited

U.S. PATENT DOCUMENTS

2004/0051862 A1    3/2004  Alcock et al.
2021/0152681 A1*   5/2021  Yoon ....................... H04N 23/54

FOREIGN PATENT DOCUMENTS

CN    102591000 A    7/2012
CN    110763202 A    2/2020
CN    111142314 A    5/2020

* cited by examiner

*Primary Examiner* — Thanh Luu
(74) *Attorney, Agent, or Firm* — WPAT, PC (57) ABSTRACT

There is provided an optical engine for a navigation device including a first light source, a second light source, a lens, a carrier member and an image sensor. The carrier member has a light holder, a lens holder, an accommodation space and a tilted wall. The first light source is arranged on the light holder of the carrier member, and reflected light associated with the first light source penetrates through the lens to propagate to the image sensor inside the accommodation space. Reflected light associated with the second light source penetrates through the tilted wall of the carrier member to propagate to the image sensor.

18 Claims, 9 Drawing Sheets

OPTICAL ENGINE WITH MULTIPLE LIGHT SOURCES AND PACKAGE STRUCTURE THEREOF

RELATED APPLICATIONS

The present application is a continuous application of U.S. application Ser. No. 17/841,582, filed on Jun. 15, 2022, which claims the priority benefit of U.S. Provisional Application Ser. Number U.S. 63/235,823, filed on Aug. 23, 2021, the disclosures of which are hereby incorporated by reference herein in their entirety.

The U.S. Ser. No. 17/841,582 is also a continuation-in-part application of U.S. application Ser. No. 17/375,035, filed on Jul. 14, 2021, which is a continuation application of U.S. application Ser. No. 16/547,568, filed on Aug. 22, 2019, which claims the priority benefit of U.S. Provisional Application Ser. No. 62/756,110, filed Nov. 6, 2018, the full disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an optical engine having multiple light sources and, more particularly, to an optical engine having multiple light sources adapted to navigation devices and capable of solving the problem of interference between the multiple light sources, and a carrier member of the optical engine.

2. Description of the Related Art

The optical navigation device uses a light source to illuminate a working surface and uses an image sensor to capture reflected light from the working surface to generate image frames. A processor calculates a moving distance and/or speed of the navigation device with respect to the working surface according to the image frames.

However, different working surfaces generally have different reflectivity that causes image features contained in the image frames to have apparent variations. Accordingly, a navigation device capable of distinguishing working surfaces of different materials is required.

SUMMARY

The present disclosure provides a barrier structure of an optical engine accommodating multiple light sources to be switched corresponding to different working surfaces to be applicable to the operation on different working surfaces.

The present disclosure further provides a barrier structure of an optical engine accommodating multiple light sources and preventing the interference between emission light and reflected light of different light sources.

The present disclosure further provides an optical engine and a carrier member or a package structure thereof that have higher light using efficiency and obtain information of the same region of a working surface.

The present disclosure provides a package structure of an optical engine including a light containing structure, an optical carrier structure, a chip containing structure and a tilted wall. The light containing structure includes a light source contain space configured to contain a first light source. The optical carrier structure includes a lens contain space. The chip containing structure includes an opening and a chip contain space configured to contain a second light source and an image sensor. The tilted wall is arranged adjacent to the optical carrier structure. The optical carrier structure is above a part of the chip containing structure. The tilted wall is above another part of the chip containing structure but does not cover the opening of the chip containing structure.

The present disclosure further provides a package structure of an optical engine including a light containing structure, an optical carrier structure, a chip containing structure and a tilted wall. The light containing structure includes a light source contain space configured to contain a first light source. The optical carrier structure includes a lens contain space. The chip containing structure includes a chip contain space configured to contain a second light source and an image sensor. The tilted filter is arranged upon the chip contain space. The optical carrier structure is between the light containing structure and the tilted filter in a transverse direction. The optical carrier is partially overlapped with the chip containing space in a longitudinal direction.

The present disclosure further provides an optical engine including a package structure, a first light source, a second light source, a lens and an image sensor. The package structure includes a light containing structure, an optical carrier structure, a chip containing structure and a filter sidewall. The light containing structure includes a light source contain space. The optical carrier structure includes a lens contain space. The chip containing structure includes a chip contain space. The filter sidewall is arranged above the chip contain space. The first light source is arranged in the light source contain space. The second light source is arranged in the chip contain space. The lens is arranged in the lens contain space. The image sensor is arranged in the chip contain space. The lens is arranged between the first light source and the second light source in a transverse direction. The second light source is arranged to be lower than the lens and the first light source.

The present disclosure provides a package structure of an optical engine including a light containing structure, an optical carrier structure, a chip containing structure and a tilted wall. The light containing structure has a light source contain space. The optical carrier structure has a lens contain space. The chip containing structure has a chip contain space. The tilted wall is arranged upon the chip contain space.

The present disclosure provides a package structure of an optical engine including a light containing structure, an optical carrier structure, a chip containing structure and a filter sidewall. The light containing structure has a light source contain space. The optical carrier structure has a lens contain space. The chip containing structure has a chip contain space. The filter sidewall is arranged upon the chip contain space.

BRIEF DESCRIPTION OF THE DRAWINGS

Other objects, advantages, and novel features of the present disclosure will become more apparent from the following detailed description when taken in conjunction with the accompanying drawings.

FIG. 1 is a solid diagram of an optical engine according to one embodiment of the present disclosure.

DETAILED DESCRIPTION OF THE EMBODIMENT

It should be noted that, wherever possible, the same reference numbers will be used throughout the drawings to refer to the same or like parts.

The present disclosure provides an optical engine having multiple light sources. The optical engine has a barrier structure for protecting the elements therein and preventing the interference between emission light of different light sources and reflected light from a working surface to improve the identification accuracy. The optical engine is adapted to, for example, a navigation device operating on the working surface, e.g., a cleaning robot, but not limited thereto.

Figure 1:
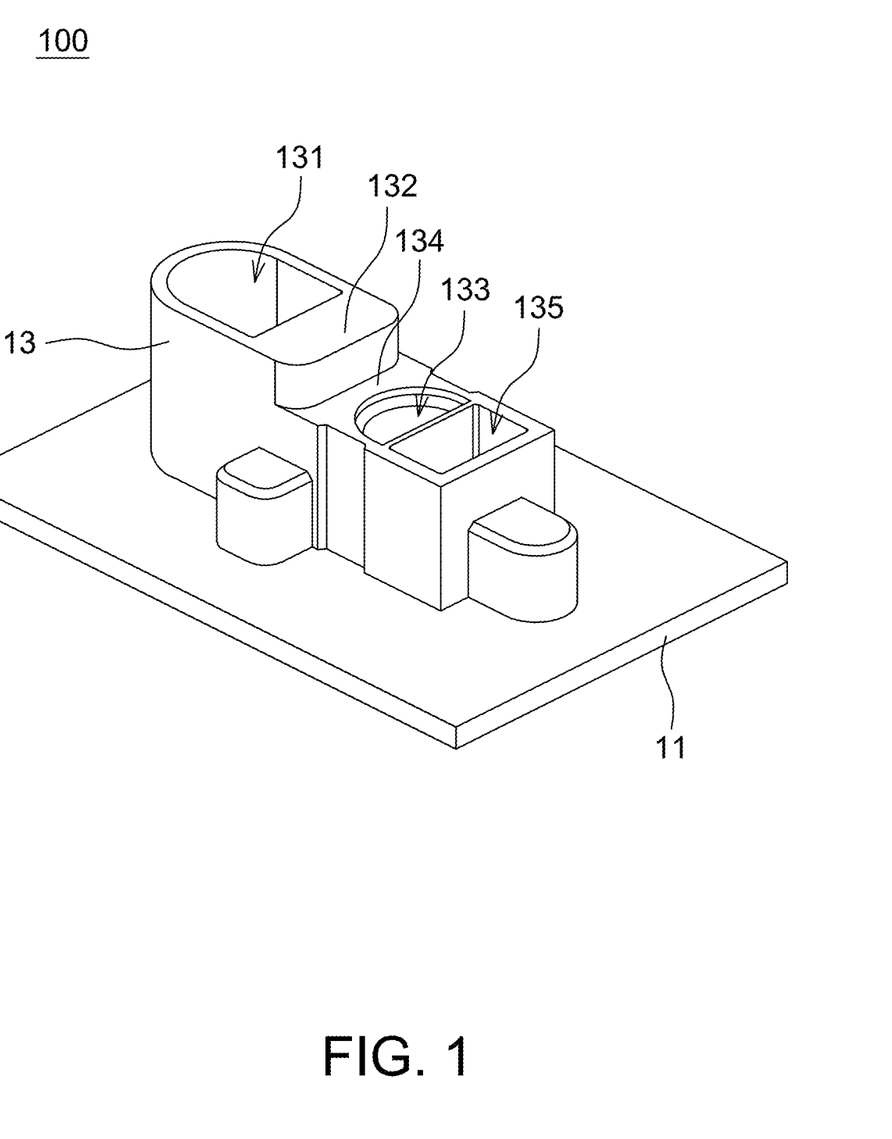
Figure 2:
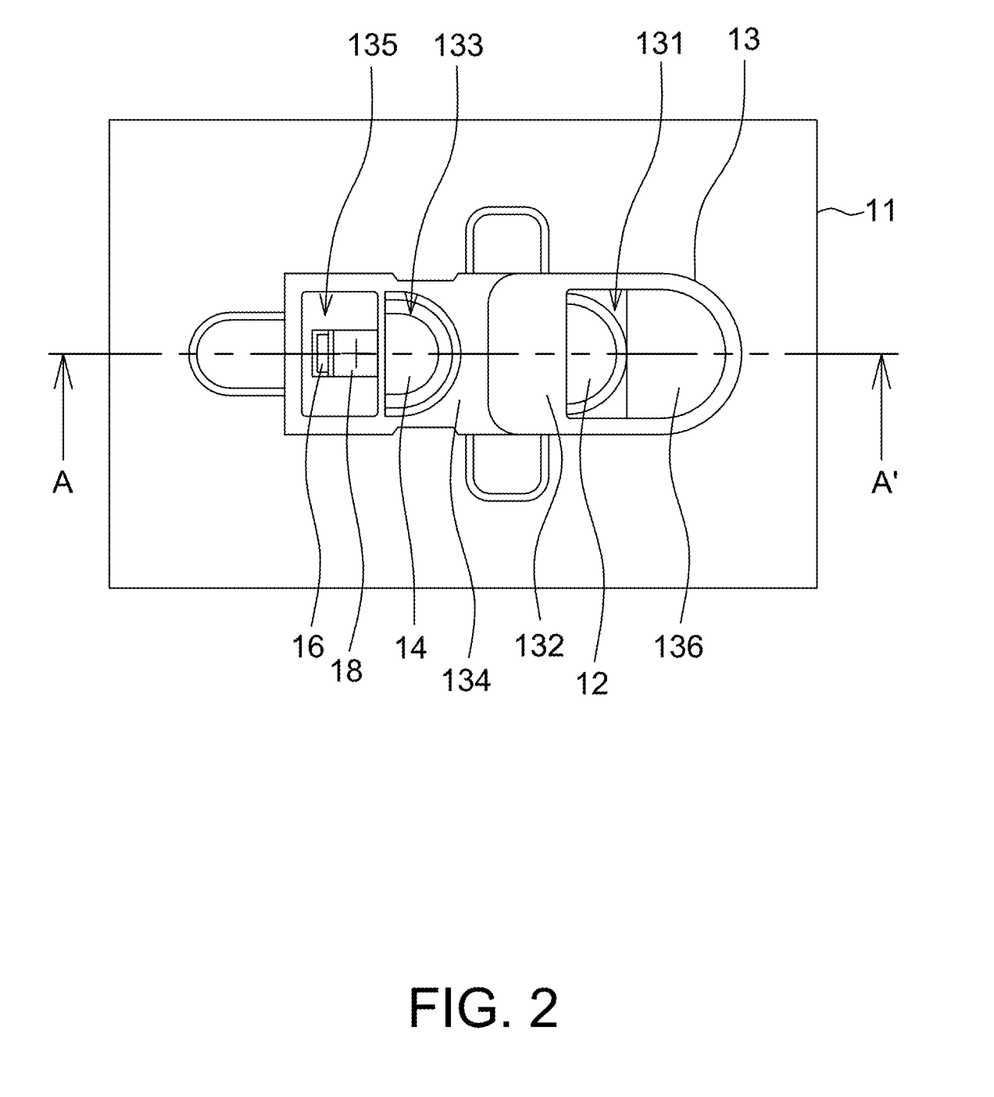
FIG. 2 is an upper view of an optical engine according to one embodiment of the present disclosure.
Figure 3:
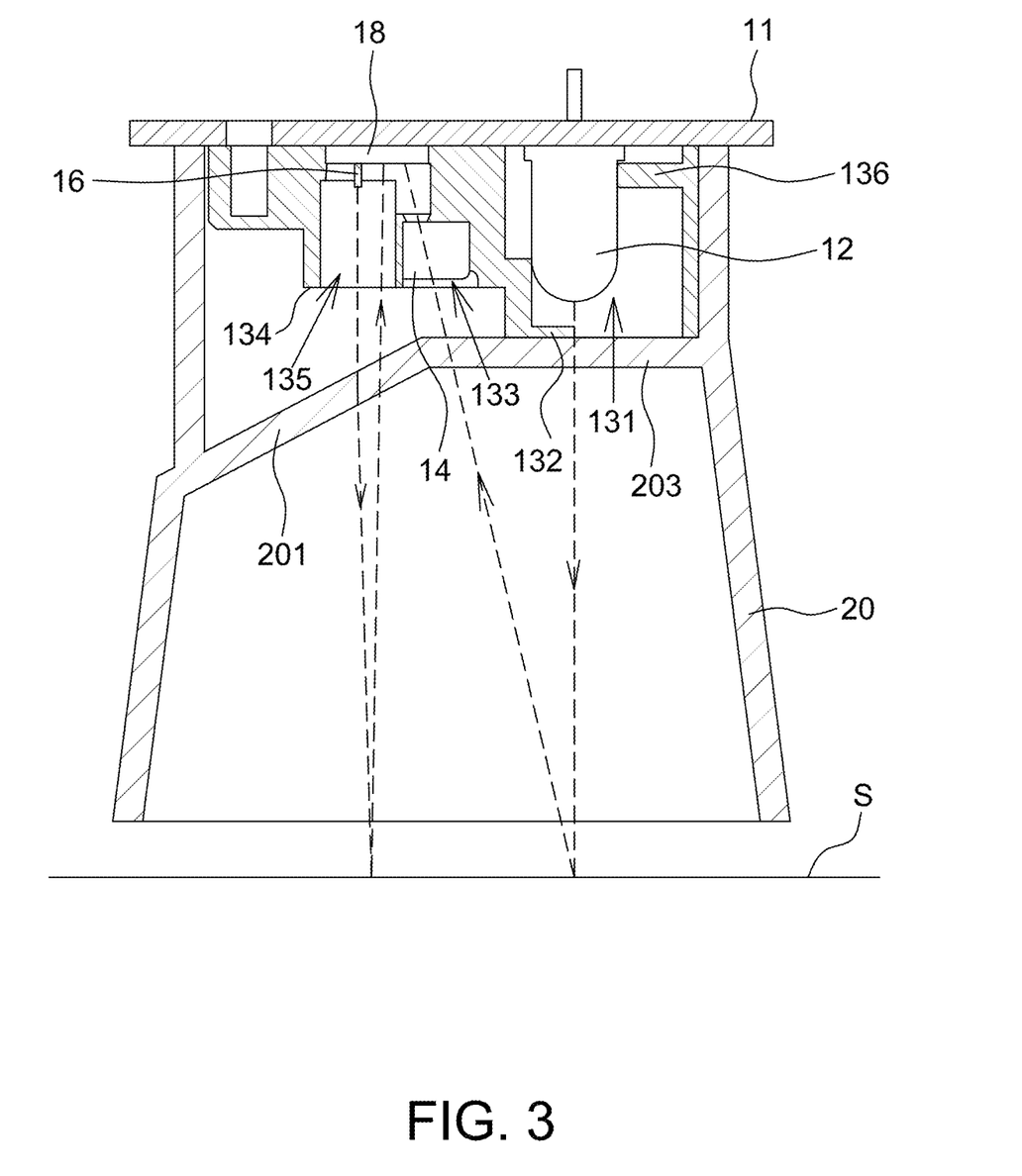
FIG. 3 is a cross-sectional view of the optical engine and a hood alone line A-A' in FIG. 2.

Referring to FIGS. 1 to 3, FIG. 1 is a solid diagram of an optical engine 100 according to one embodiment of the present disclosure; FIG. 2 is an upper view of an optical engine 100 according to one embodiment of the present disclosure; and FIG. 3 is a cross-sectional view of the optical engine 100 alone line A-A' in FIG. 2 and a hood 20.

Figure 6:
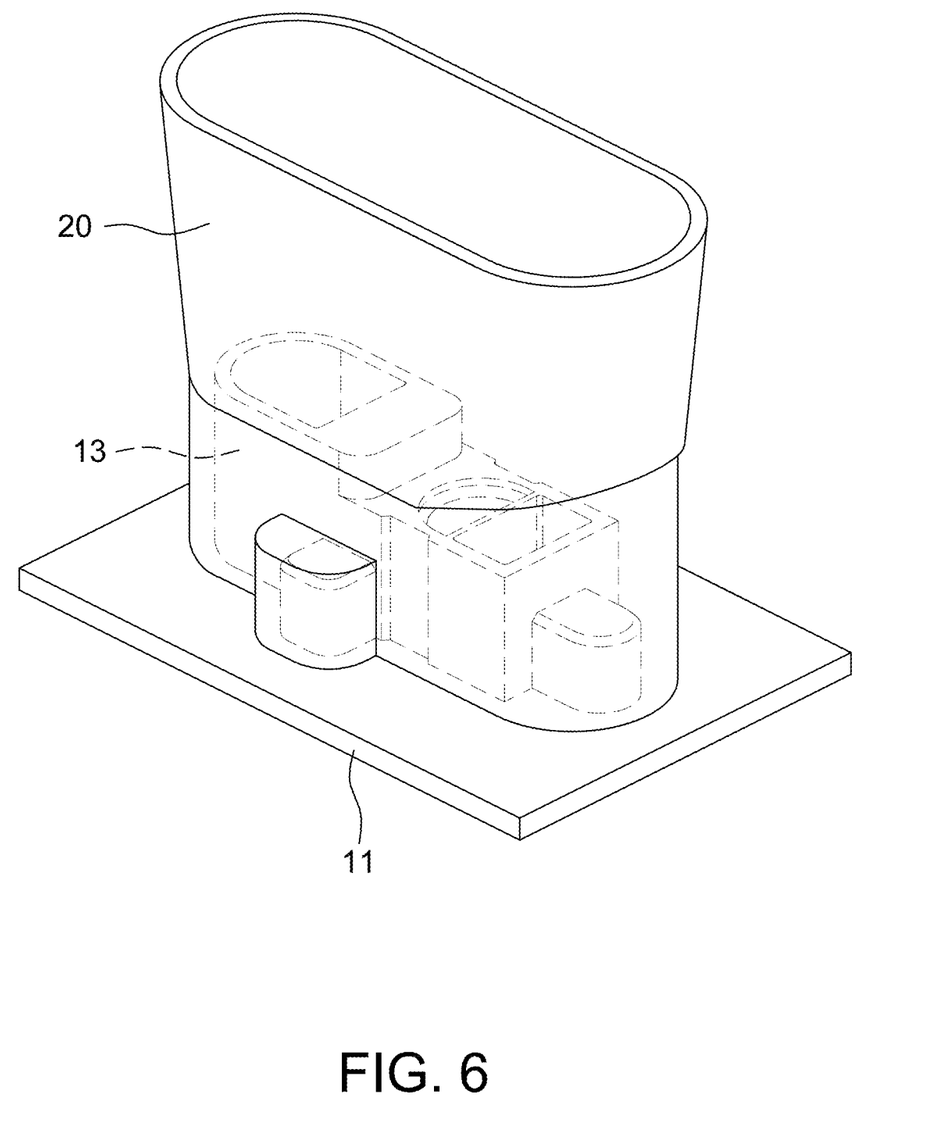
FIG. 6 is another solid diagram of an optical engine according to one embodiment of the present disclosure.

The optical engine 100 includes a first light source 12, a lens 14, a second light source 16, an image sensor 18, a substrate 11 and a barrier structure 13 disposed on the substrate 11, wherein the barrier structure 13 is attached to the substrate 11 via glue or screwing member without particular limitations. The substrate 11 is a printed circuit board (PCB) or a flexible substrate without particular limitations. In some embodiments, the optical engine 100 further includes a hood 20 (further referring to FIG. 6) arranged on the substrate 11 and covering the barrier structure 13 for dust protection and blocking ambient light. The hood 20 is attached to the substrate 11 via glue or screwing member without particular limitations.

The barrier structure 13 is preferably not transparent to the light emitted by the first light source 12 and the second light source 16. The material of the barrier structure 13 is not particularly limited, such as plastic, and is manufactured by, for example, injection molding. The barrier structure 13 has a first plane surface 132 and a second plane surface 134 parallel to the substrate 11. In one aspect, the first plane surface 132 is higher than the second plane surface 134. The first plane surface 132 has a first opening 131 to have a first space therebelow. The second plane surface 134 has a second opening 133 and a third opening 135 adjacent to each other to respectively have a second space and a third space therebelow. Said openings and spaces are used as the tunnel for light beams propagating in and out the barrier structure 13.

The first light source 12 is arranged inside the first opening 131 (i.e. in the first space) and electrically coupled to the substrate 11 to receive control signals and power therefrom. The first light source 12 is described herein using a light emitting diode as an example (e.g., infrared light emitting diode, but not limited to). The first light source 12 is used to generate emission light leaving the first opening 131 in a direction substantially perpendicular to the substrate 11 to illuminate the working surface S. For fixing the first light source 12, in some aspects the barrier structure 13 further includes a protrusion structure 136 pressing against the first light source 12. It should be mentioned that although FIG. 3 shows that the protrusion structure 136 perpendicularly extends from the barrier structure 13 in a transverse direction, it is only intended to illustrate but not to limit the present disclosure. In other aspects, the protrusion structure 136 extends from the barrier structure 13 with a tilt angle (e.g., upward or downward) to press against a surface of the first light source 12. In other aspects, the side wall surrounding the first opening 131 (or the first space) of the barrier structure 13 is manufactured to have a larger thickness to directly attach to the side of the first light source 12 to fix the first light source 12 therein without forming the transverse protrusion structure 136, i.e. the first light source 12 just fitting the first space.

The lens 14 is arranged inside the second opening 133 (or the second space) to guide reflected light from the working surface S and associated with the first light source 12 to the image sensor 18. In some aspects, in order to be able to arrange the lens 14 into the second opening 133, the lens 14 is cut to reshape the appearance thereof (e.g., having non-circular cross-section). It should be mentioned that although FIG. 3 shows that a single lens 14 is arranged inside the second opening 133, the present disclosure is not limited thereto. Corresponding to different applications, a lens set having more than one lens is arranged in the second opening 133, and the barrier structure 13 is formed with a structure to carry said lens set.

The second light source 16 is arranged inside the third opening 135 (i.e. in the third space) and electrically coupled to the substrate 11 to receive control signals and power therefrom. The second light source 16 is described herein using a laser diode as an example (e.g., infrared laser diode, but not limited to). The second light source 16 is used to generate emission light leaving the barrier structure 13 via the third opening 135 to illuminate the working surface S. In one aspect, the second light source 16 and the first light source 12 respectively illuminate different areas on the working surface S. In one aspect, there is no any optical component arranged inside the third opening 135 to expand or shrink emission light generated by the second light source 16.

The image sensor 18 is arranged under the third opening 135 (i.e. in the third space) and electrically coupled to the substrate 11 to receive/send signals therethrough. The image sensor 18 is a CMOS image sensor, a CCD image sensor or the like. In one aspect, the second light source 16 and the image sensor 18 are encapsulated in a same chip package, which is disposed on the substrate 11 and electrically connected thereto. In this case, a blocking layer is preferably formed between the second light source 16 and the image sensor 18 to prevent the emission light from the second light source 16 from directly being received by the image sensor 18. In other aspects, said chip package further has a processor, e.g., an application specific integrated circuit (ASIC) or a digital signal processor (DSP), to process image signals acquired by the image sensor 18.

Figure 4:
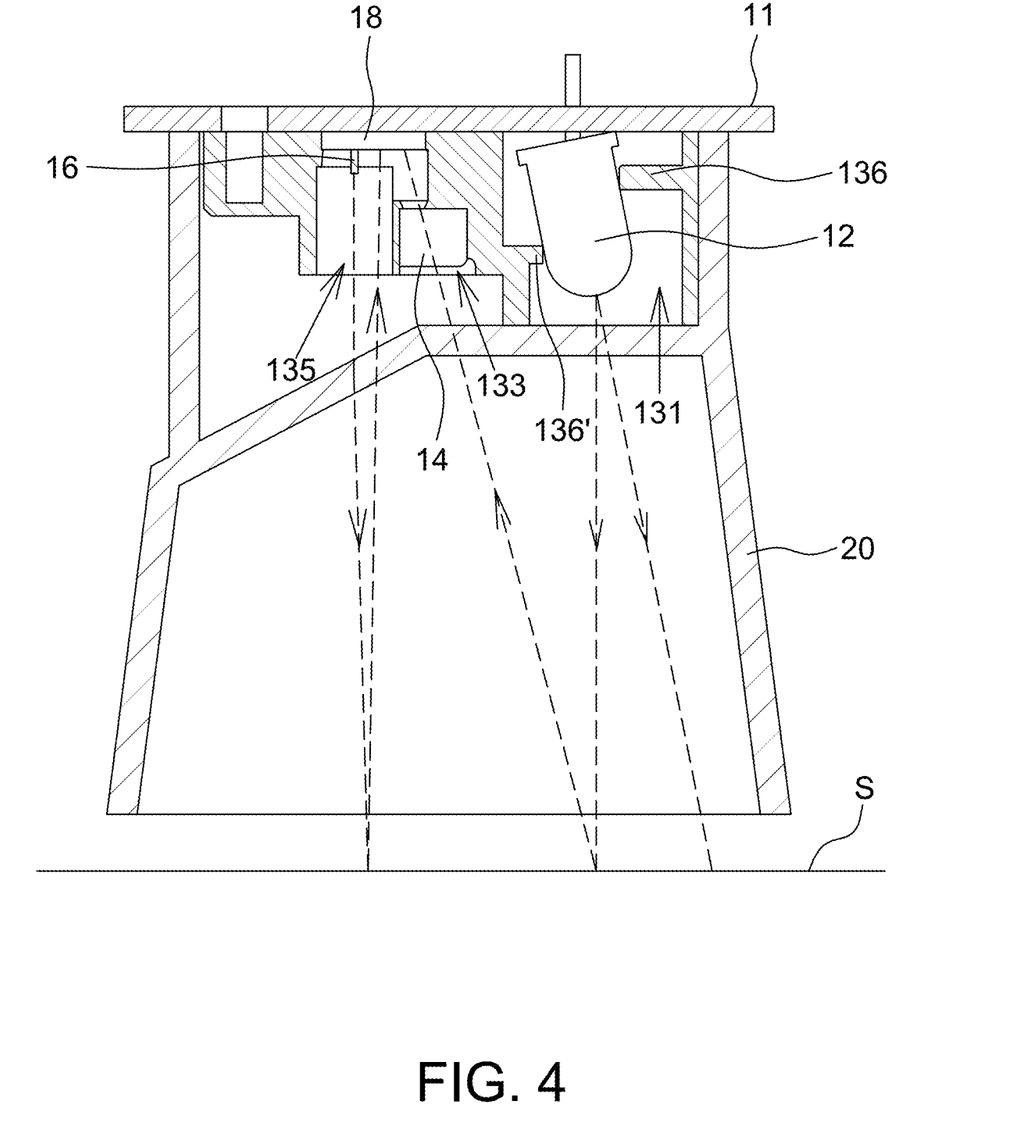
FIG. 4 is a cross-sectional view of an optical engine according to another embodiment of the present disclosure.
Figure 5:
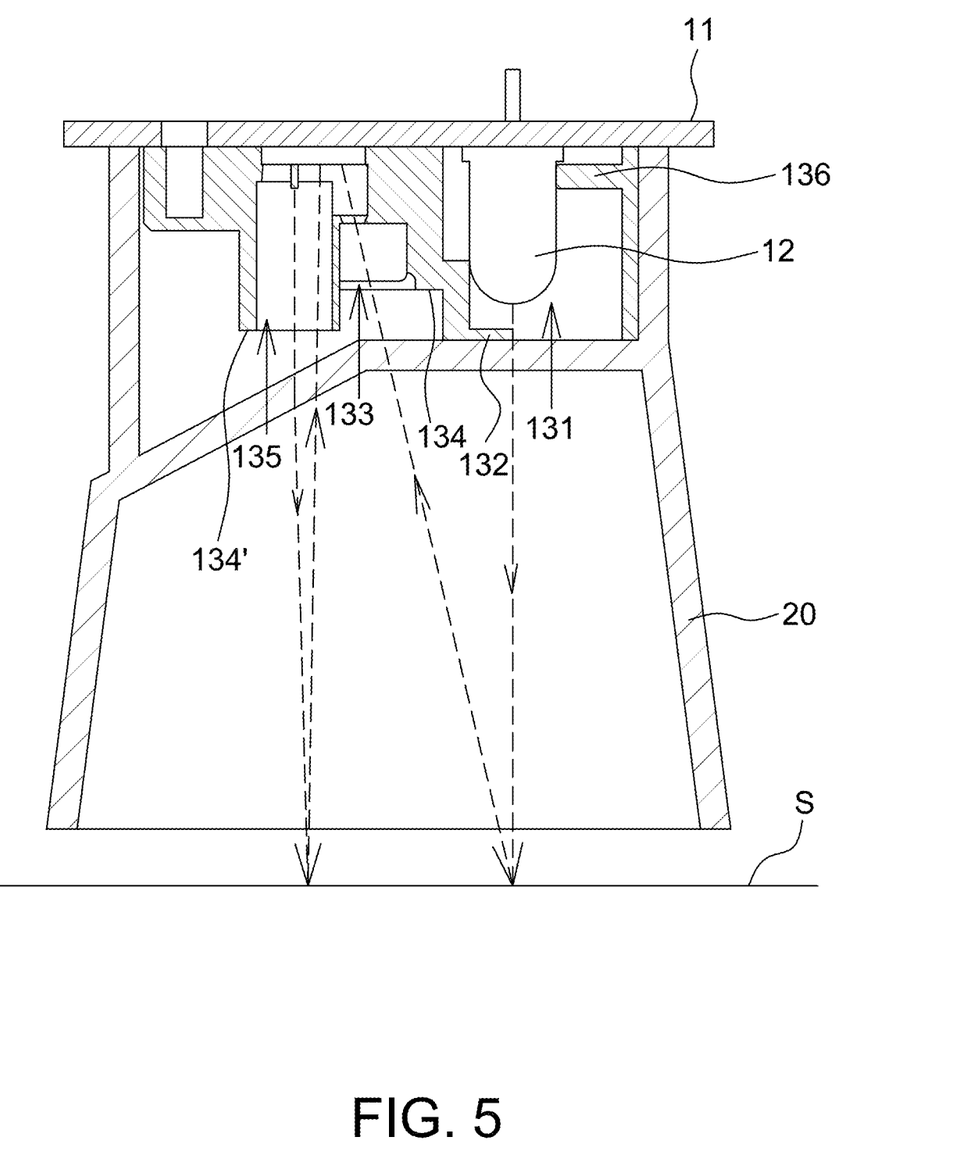
FIG. 5 is a cross-sectional view of an optical engine according to an alternative embodiment of the present disclosure.

The image sensor 18 has a sensing surface (e.g., the bottom surface in the FIGS. 3 to 5). A part of the sensing surface overlaps the third opening 135 and another part of the sensing surface overlaps the second opening 133 and the lens 14. In this way, a part of the sensing surface of the image sensor 18 receives reflected light that enters the barrier structure 13 via the third opening 135, wherein the reflected light is formed after being emitted by the second light source 16 and then reflected by the working surface S. Another part of the sensing surface of the image sensor 18 receives reflected light via the lens 14 in the second opening 133, wherein the reflected light is formed after being emitted by the first light source 12 and then reflected by the working surface S.

In this embodiment, to prevent the reflected light associated with the first light source 12 from being received by the image sensor 18 via the third opening 135, the first plane surface 132 blocks a part of the first light source 12 (e.g., FIGS. 2 and 3 showing a half being blocked and the other half being exposed) to block reflected light of the emission light generated by the first light source 12 from entering the third opening 135. The area being blocked is determined according to a transverse distance between the first light source 12 and the image sensor 18 as well as a vertical distance between the first light source 12 and the working surface S. The inner surface of the first plane surface 132 is directly attached to the top of the first light source 12 or separated from the first light source 12.

In this embodiment, different areas of the image frame captured by the image sensor 18 is used by a processor (included in the chip package or coupled to the image sensor 18 via the substrate 11) to calculate the detection result of different light sources. Other arrangements are used in the present disclosure to avoid the interference between light from different light sources.

Referring to FIG. 4, it is a cross-sectional view of an optical engine and a hood 20 according to another embodiment of the present disclosure. In this embodiment, the first plane surface 132 does not cover upon the first light source 12. By arranging the first light source 12 to generate emission light leaving the first opening 131 in a direction tilted away from the lens 14 (e.g., FIG. 4 showing toward a lower-right direction), reflected light of the emission light generated by the first light source 12 only reaches the second opening 133 without entering the third opening 135.

The difference between this embodiment and that of FIG. 3 is that the first light source 12 is arranged with a tilted angle (i.e. an emission axis thereof not perpendicular to the substrate 11) to realize the objective of eliminating the interference. The arrangement of other components is identical to FIG. 3, and thus details thereof are not repeated herein.

In this embodiment, as the first light source 12 is arranged with a tilt angle, at least one protrusion structure (e.g., two protrusion structures 136 and 136' being shown herein, but not limited to) is selected to form inside the first opening 131 to press again and fix the first light source 12. In other aspects, the size of the first opening 131 (or first space) is manufactured to fit a size of the first light source 12 such that when the first light source 12 is inserted into the first space, the first light source 12 is fixed and has the predetermined tilt angle.

Referring to FIG. 5, it is a cross-sectional view of an optical engine and a hood 20 according to an alternative embodiment of the present disclosure. In this embodiment, the barrier structure 13 has a first plane surface 132, a second plane surface 134 and a third plane surface 134', wherein the first plane surface 132 has a first opening 131 to have a first space therebelow; the second plane surface 134 has a second opening 133 to have a second space therebelow; and the third plane surface 134' has a third opening 135 to have a third space therebelow, and the second plane surface 134 is lower than the first plane surface 132 and the third plane surface 134'. More specifically, in this embodiment, a height of the side wall of the third opening 135 is increased to prevent reflected light, formed after being emitted by the first light source 12 and reflected by the working surface S, from entering the third opening 135. In one aspect, the first plane surface 132 and the third plane surface 134' have an identical height, but not limited to. The difference between this embodiment and that of FIG. 3 is that the side wall surrounding the third opening 135 (or third space) is increased to be higher than the second plane surface 134. The arrangement of other components is identical to FIG. 3 and thus details thereof are not repeated herein.

The hood 20 preferably has a tilted part 201 and a transverse part 203 therein (as shown in FIG. 3-5) that are transparent to the emission light of the second light source 16 and the first light source 12, respectively, or transparent to the sensing spectrum of the image sensor 18. The tilted part 201 preferably causes the emission light from the second light source 16 to be refracted (e.g., toward lower-right direction in figure) after passing through, and a refracted angle is arranged to cause the reflected light from the working surface S associated with the second light source 16 to propagate to the image sensor 18 via the third opening 135 instead of via the second opening 133. Preferably, the emission light of the first light source 12 is not refracted while passing through the transverse part 203.

In an alternative aspect, the transverse part 203 is arranged in the way to refract the emission light from the first light source 12 to bend toward right side of the figure to have the same effect of FIG. 4. In this way, the first light source 12 is not arranged in a tilt angle to prevent the emission light of the first light source 12 to be reflected to enter the third opening 135.

Although the above embodiments described that the reflected light associated of the first light source 12 does not enter the third opening 135 and the reflected light associated with the second light source 16 does not enter the second opening 133, it is appreciated that this only means most energy of the emission light of the first light source 12 and the second light source 16 does not enter the corresponding opening. As the working surface S has the light scattering effect, a small part of the emission light of the first light source 12 is still scattered to the third opening 135 and a small part of the emission light of the second light source 16 is still scattered to the second opening 133. As the energy of the scattered light is relatively small, detecting efficiency is considered not being affected thereby.

It is appreciated that the shape of every opening in the above embodiments is only intended to illustrate but not to limit the present disclosure.

Figure 7:
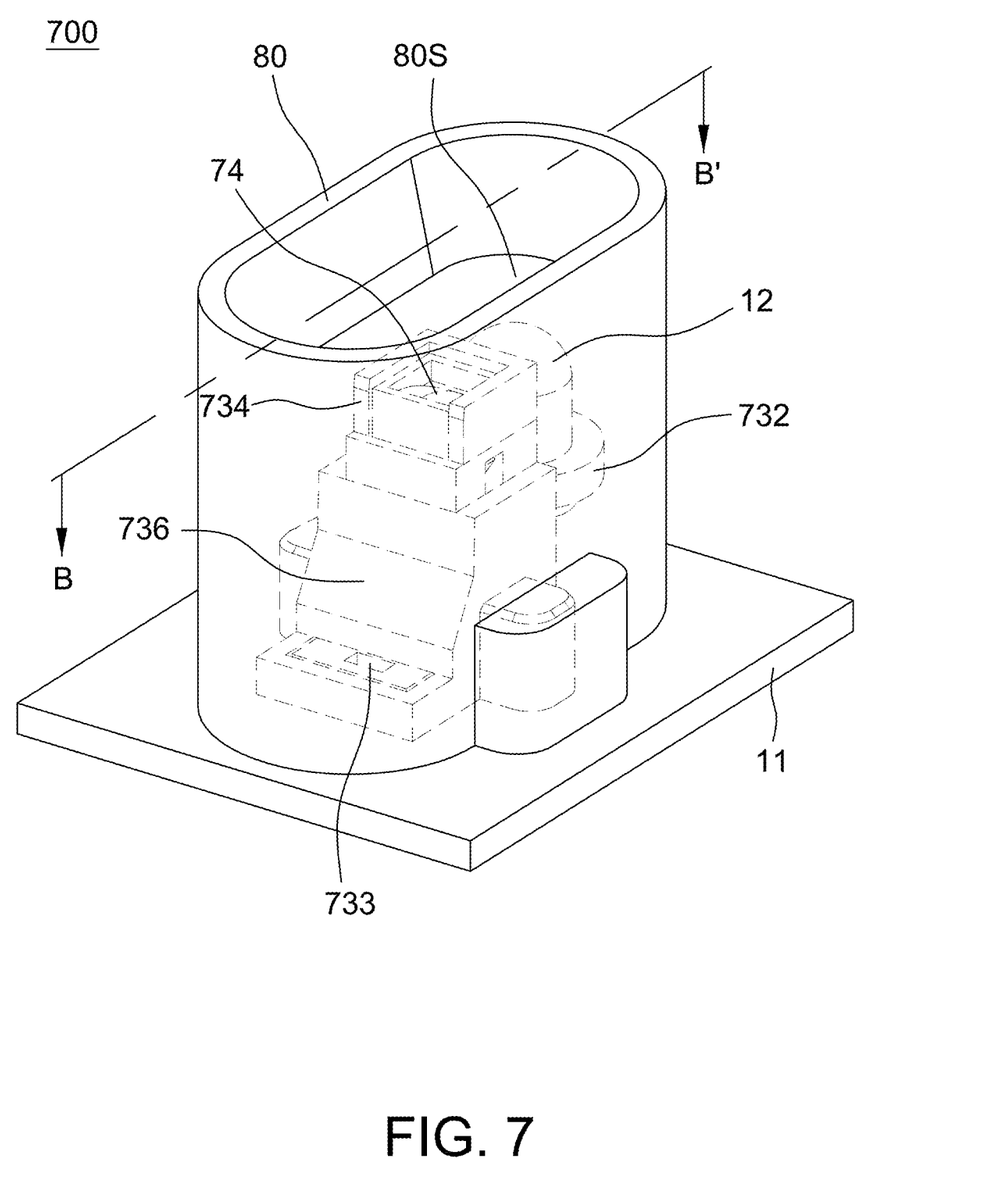
FIG. 7 is a solid diagram of an optical engine and a hood thereof according to a second embodiment of the present disclosure.
Figure 8:
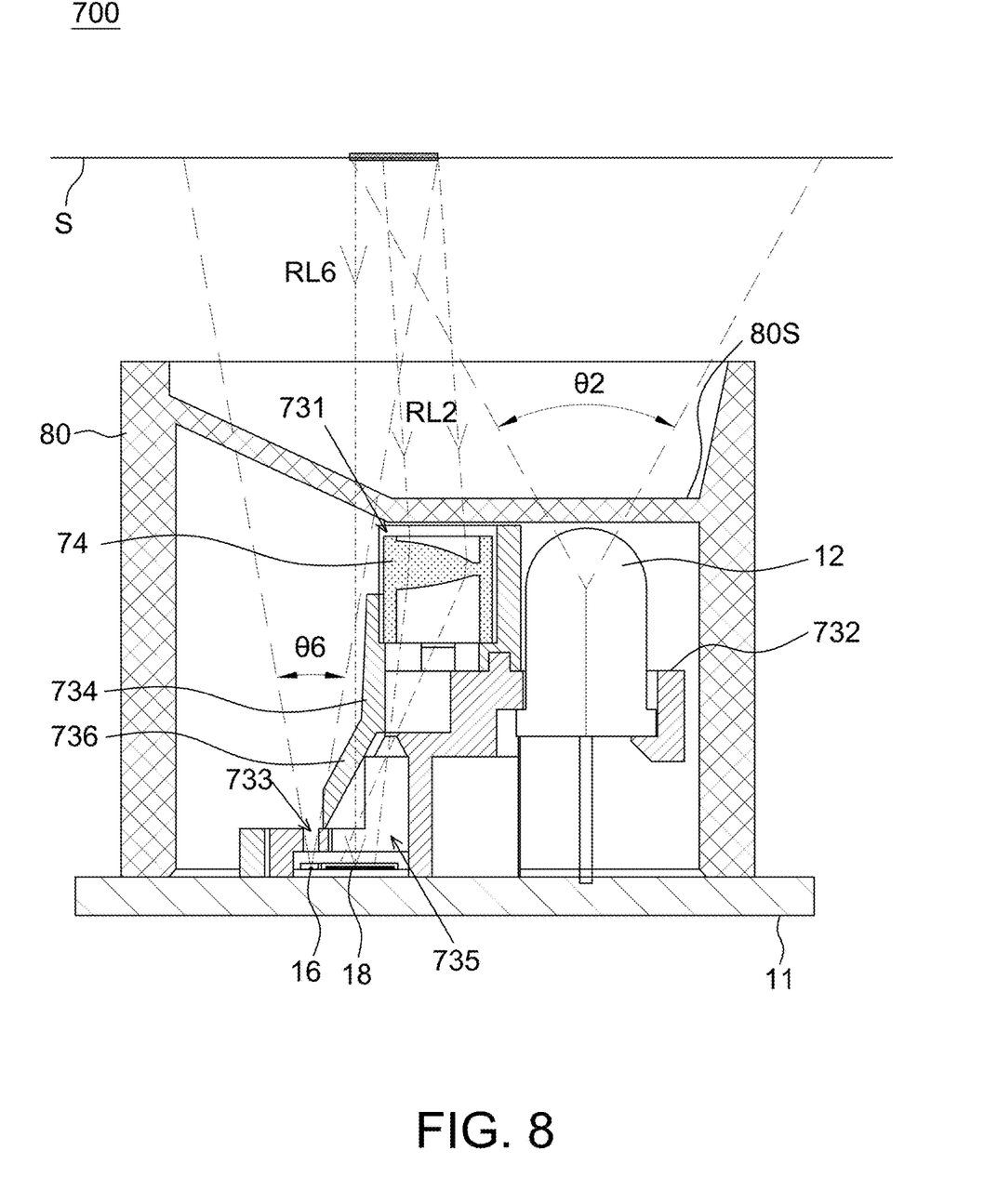
FIG. 8 is a cross-sectional view of the optical engine and the hood thereof alone line B-B' in FIG. 7.
Figure 9:
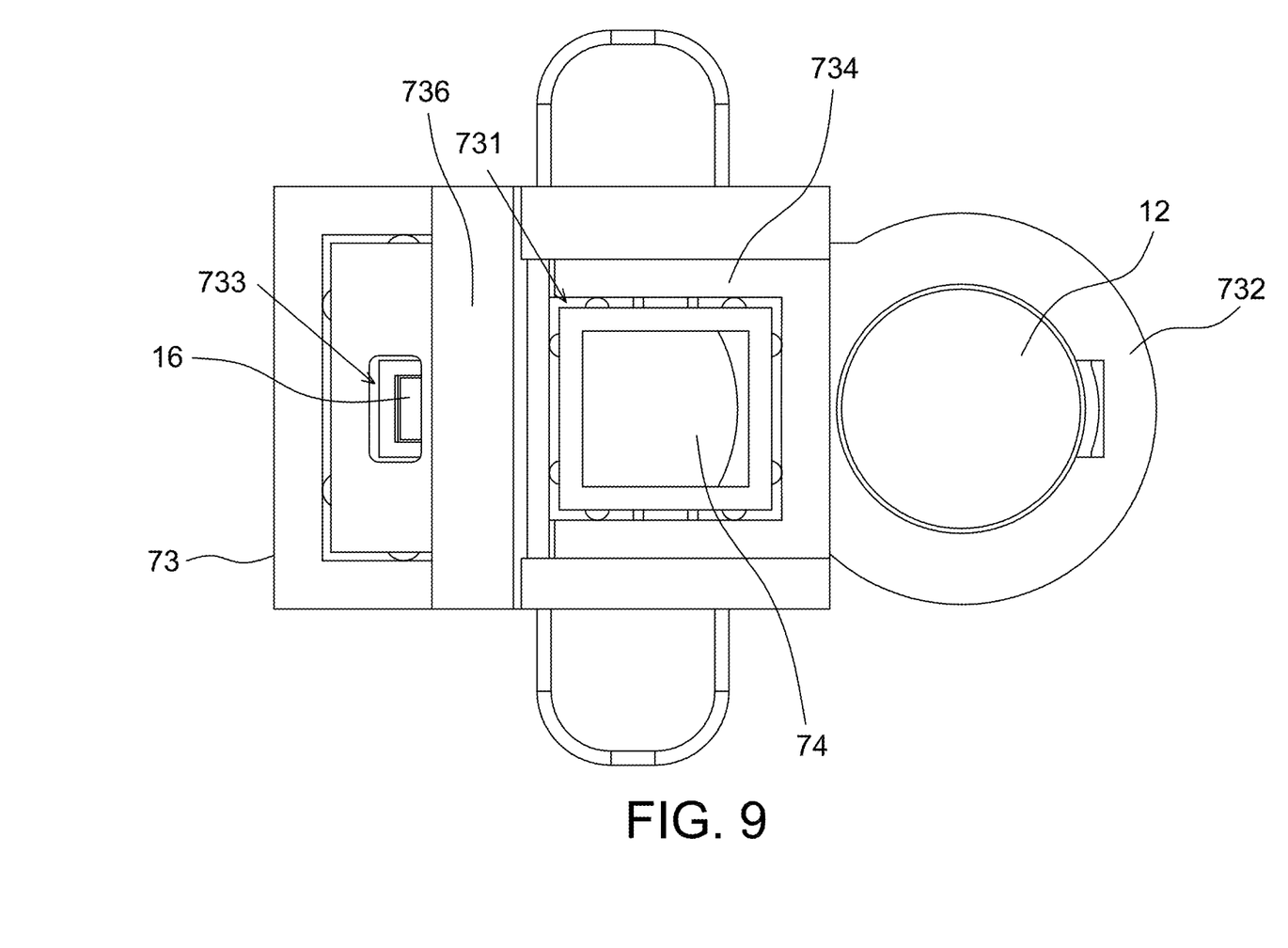
FIG. 9 is an upper view of an optical engine according to a second embodiment of the present disclosure.

Please refer to FIG. 7 to FIG. 9, FIG. 7 is a solid diagram of an optical engine 700 and a hood 80 thereof according to a second embodiment of the present disclosure; FIG. 8 is a cross-sectional view of the optical engine 700 and the hood

80 alone line B-B' in FIG. 7; and FIG. 9 is an upper view of an optical engine according to a second embodiment of the present disclosure.

In the second embodiment, elements identical to those in FIG. 1 to FIG. 3 are indicated by the same numerical references. For example, the substrate 11, the first light source 12, the second light source 16 and the image sensor 18 in the second embodiment are identical to those of the above embodiments, and thus details thereof are not repeated herein. In the second embodiment, the lens 74 is, for example, a condensing lens which is also cut to regulate a shape thereof. The lens 74 is formed by a single lens or a lens set without particular limitations.

In the second embodiment, the first light source 12 is a light emitting diode, is electrically coupled to the substrate 11 and emits light of a first wavelength. The method of electrically coupling the first light source 12 to the substrate 11 is not particularly limited. The second light source 16 is a laser diode, is arranged on the substrate 11 and emits light of a second wavelength. In one aspect, the first wavelength is different from the second wavelength so as to generate different reflecting and scattering effects corresponding to different material of the working surface S. For example, the first wavelength is within a range between 600 nm and 660 nm, and the second wavelength is within a range between 820 nm and 880 nm, but the present disclosure is not limited thereto. The image sensor 18 is also arranged on the substrate 11.

As mentioned above, the second light source 16 and the image sensor 18 are two individual elements (respectively arranged on the substrate 11) or accommodated in the same chip package without particular limitations.

In the second embodiment, the carrier member 73 (or called package structure herein) is formed by, for example, injection molding and then assembled on the substrate 11. For example, FIG. 9 shows that the carrier member 73 has two wings (shown at upper and lower sides) for being secured to the substrate 11 via screwing members (not shown). It is able to assemble the carrier member 73 to the substrate 11 using other method, e.g., using adhesive.

The carrier member 73 includes a light holder 732 (as one aspect of a light containing structure of the carrier member), a lens holder 734 (as one aspect of an optical carrier structure of the carrier member), an accommodation space 735 (as a chip contain space which is located in a chip containing structure of the carrier member) and a tilted wall 736 (also called filter sidewall while having light filtering ability). In one aspect, the lens holder 734 is located between the light holder 732 and the tilted wall 736 in a transverse direction (e.g., left-right direction in FIG. 8), and the lens holder 734 is higher than the light holder 732 and the tilted wall 736 at the longitudinal direction.

In one aspect, the tilted wall 736 is integrated with the lens holder 734 (e.g., the tilted wall 736 being a part of the lens holder 734), and extended downward at an angle in a direction (e.g., shown as left side in FIG. 8) farther away from the light holder 732. Said angle is determined according to a height of the lens holder 734 as well as a transverse distance between the lens holder 734 and a second opening 733, which is at an upper plate above the accommodation space 735 and adjacent to the tilted wall 736.

In one aspect, the light holder 732 and the lens holder 734 are two individual elements (e.g., independently manufactured and having different material), and are combined together (e.g., using latching structure or adhesive with particular limitations) to form an integral whole as a part of the carrier member 73. For example, FIG. 8 shows that the light holder 732 is attached to the lens holder 734 from the lower side of the lens holder 734.

The light holder 732 is used to fix the first light source 12 (e.g., plugged into a holder hole thereof) such that the first light source 12 emits light toward an opposite side of the substrate 11 to illuminate the working surface S. That is, the light holder 732 has a light source contain space for containing the first light source 12. It should be mentioned that although FIG. 8 shows that the first light source 12 is vertically arranged in the light holder 732, the present disclosure is not limited thereto. In another aspect, the first light source 12 is arranged in the light holder 732 with a tilted angle, e.g., inclined toward the lens holder 734.

The lens holder 734 is adjacent to the light holder 732 in a first direction (e.g., left direction in FIG. 8), and has a first opening 731 for arranging and fixing the lens 74 therein. That is, the lens holder 734 has a lens contain space for containing the lens 74.

The accommodation space 735 of the chip containing structure accommodates the second light source 16 and the image sensor 18. Furthermore, the carrier member 73 further has a second opening 733 located on the chip containing structure and connecting to the accommodation space 735 to allow emission light of the second light source 16 to leave the accommodation space 735 via the second opening 733. In the aspect that the carrier member 73 is formed by combining the light holder 732 and the lens holder 734 which are independently manufactured from each other, the accommodating space 735 is inside the lens holder 734 and the second opening 733 is located on the lens holder 734. In one aspect, the second light source 16 is arranged right below the second opening 733.

The tilted wall 736 is adjacent to the lens holder 734 in the first direction, and arranged upon the image sensor 18 that is arranged inside the accommodation space 735. Preferably, the light holder 732 has a through hole between the first opening 731 and the accommodation space 735 to allow reflected light passing the lens 74 to go through to reach the image sensor 18.

In the second embodiment, reflected light (i.e. reflected by the working surface S) associated with the first light source 12 penetrates through the lens 74 to propagate to the image sensor 18. In one aspect, a part of the accommodation space 735 is below the lens holder 734 such that a part of the image sensor 18 in the accommodation space 735 is arranged below the lens 74. Reflected light (i.e. reflected by the working surface S) associated with the second light source 16 penetrates through the tilted wall 736 to propagate to the image sensor 18.

To avoid interference between the two light sources, in one aspect the light holder 732 is made of opaque material. The tilted wall 736 is opaque to emission light of a first wavelength from the first light source 12 but transparent to emission light of a second wavelength from the second light source 16. The lens 74 is opaque to emission light of the second wavelength from the second light source 16 but transparent to emission light of the first wavelength from the first light source 12.

In the aspect that an emission angle θ2 of the first light source 12 is arranged in the way that reflected light of the first wavelength does not propagate to the tilted wall 736, the tilted wall 736 is not arranged to have light filtering ability, i.e. made of transparent material.

In the aspect that the lens holder 734 is integrated with the tilted wall 736, the lens holder 734 is opaque to emission light of the first wavelength from the first light source 12 but transparent to emission light of the second wavelength from the second light source 16.

To allow the image sensor 18 to capture features of the same region at the working surface S, a first illuminated region of the first light source 12 (shown to have an emission angle θ2) on the working surface S, which is at a predetermined distance, is partially overlapped with a second illuminated region of the second light source 16 (shown to have an emission angle θ6) on the working surface, e.g., shown as a region filled with slant lines in FIG. 8.

In the second embodiment, by arranging the lens 74 and the tilted wall 736 to limit light of specific wavelength (e.g., selecting material thereof) to go through, the emission lights from the first light source 12 and the second light source 16 do not interfere to each other such that no light blocking member needs to be arranged in front of the first light source 12 to limit the emission angle θ2 of the first light source 12, and thus the light using efficiency is improved.

In one aspect, the second embodiment also includes a hood 80 arranged on the substrate 11 and covering the carrier member 73 to protect the whole optical engine. The wall of the hood 80, e.g., shown as elliptic cylinder in FIGS. 7, is arranged to be vertical to the substrate 11 to facilitate manufacturing and improve the manufacturing yield. The hood 80 has a separation plate 80S for separating two spaces, wherein one side (e.g., upper side in FIGS. 7 and 8) of the separation plate 80S is opposite to the working surface S during operation, and the other side (e.g., lower side in FIGS. 7 and 8) is opposite to the carrier member 73. In one aspect, the whole of the hood 80 is made of transparent material. In another aspect, only the separation plate 80S of the hood 80 is transparent but the wall of the hood 80 is not transparent, e.g., by coating opaque material on the surface thereof.

It should be mentioned that although the light filtering structure (i.e. filter sidewall 736) for blocking the first wavelength and allowing the second wavelength to go through is illustrated by a tilted wall, the present disclosure is not limited thereto. In other aspects, said light filtering structure is arranged as a horizontal plate above the image sensor 18, e.g., horizontally extending from the lens holder 734 and then vertically extending downward without particular limitations as long as the reflected light associated with the second light source 16 can go through said light filtering structure (e.g., the horizontal plate) before reaching the image sensor 18.

As mentioned above, to normally operate on different working surfaces, in addition to enhance the post-processing ability of the processor, utilizing multiple light sources to operate corresponding to different working surfaces is another choice. However, how to avoid the interference between different light sources is an issue to be solved. Accordingly, the present disclosure provides an optical engine for navigation devices and a carrier member thereof (e.g., FIG. 7 to FIG. 9) that light up different light sources when a type of the working surface changes so as to improve the image feature in the image frames. By arranging the passable light wavelengths of the lens and the tilted wall, the optical engine of the present disclosure can eliminate the interference between emitted light and reflected light from different light sources to improve the identification accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A package structure of an optical engine, the package structure comprising:
    a light containing structure, comprising a light source contain space configured to contain a first light source;
    an optical carrier structure, comprising a lens contain space;
    a chip containing structure, comprising an opening and a chip contain space configured to contain a second light source and an image sensor; and
    a tilted wall, arranged adjacent to the optical carrier structure, wherein
    the optical carrier structure is above a part of the chip containing structure, and
    the tilted wall is above another part of the chip containing structure but does not cover the opening of the chip containing structure.

2. The package structure as claimed in claim 1, wherein the second light source is aligned with the opening of the chip containing structure.

3. The package structure as claimed in claim 1, wherein the lens contain space is configured to contain a lens, and the tilted wall is right above the image sensor to cause the image sensor to receive a part of light via the lens and receive another part of light via the tilted wall.

4. The package structure as claimed in claim 3, wherein the tilted wall is a filter to block a first wavelength of the first light source.

5. The package structure as claimed in claim 3, wherein the lens is opaque to a second wavelength of the second light source.

6. The package structure as claimed in claim 1, wherein the tilted wall is extended downward from a side of the optical carrier structure toward the opening of the chip containing structure.

7. The package structure as claimed in claim 1, wherein the optical carrier structure is between the light containing structure and the tilted wall in a transverse direction.

8. A package structure of an optical engine, the package structure comprising:
    a light containing structure, comprising a light source contain space configured to contain a first light source;
    an optical carrier structure, comprising a lens contain space;
    a chip containing structure, comprising a chip contain space configured to contain a second light source and an image sensor; and
    a tilted filter, arranged upon the chip contain space, wherein
    the optical carrier structure is between the light containing structure and the tilted filter in a transverse direction, and
    the optical carrier is partially overlapped with the chip containing space in a longitudinal direction, wherein
    the lens contain space is configured to contain a lens, and
    the image sensor is configured to receive a part of light via the lens and receive another part of light via the tilted filter.

9. The package structure as claimed in claim 8, wherein the tilted filter is opaque to a first wavelength of the first light source.

10. The package structure as claimed in claim 8, wherein the lens is opaque to a second wavelength of the second light source.

11. The package structure as claimed in claim 8, wherein the tilted filter is lower than the optical carrier structure.

12. The package structure as claimed in claim 8, wherein the chip containing structure further comprises an opening adjacent to an end of the tilted filter.

13. An optical engine, comprising:
- a package structure, comprising:
  - a light containing structure, comprising a light source contain space;
  - an optical carrier structure, comprising a lens contain space;
  - a chip containing structure, comprising a chip contain space; and
  - a filter sidewall, arranged above the chip contain space;
- a first light source, arranged in the light source contain space;
- a second light source, arranged in the chip contain space;
- a lens, arranged in the lens contain space; and
- an image sensor, arranged in the chip contain space, wherein
- the lens is arranged between the first light source and the second light source in a transverse direction, and
- the second light source is arranged to be lower than the lens and the first light source.

14. The optical engine as claimed in claim 13, wherein the light containing structure and the optical carrier structure are two individual elements, and are combined to form an integral whole.

15. The optical engine as claimed in claim 13, wherein
- the first light source is a light emitting diode,
- the second light source is a laser diode, and
- a first wavelength of the first light source is different from a second wavelength of the second light source.

16. The optical engine as claimed in claim 13, further comprising:
- a substrate, the package structure being arranged on the substrate; and
- a hood, arranged on the substrate and covering the package structure, wherein a wall of the hood is vertical to the substrate.

17. The optical engine as claimed in claim 13, wherein the chip containing structure further comprises an opening aligned with the second light source.

18. The optical engine as claimed in claim 17, wherein the filter side wall is extended downward from a side of the optical carrier structure toward the opening of the chip containing structure.

\* \* \* \* \*